United States Patent [19]

Jackson, Jr. et al.

[11] 3,931,073

[45] Jan. 6, 1976

[54] HOT MELT COMPOSITIONS

[75] Inventors: Winston J. Jackson, Jr., Kingsport, Tenn.; William R. Darnell, Weber City, Va.

[73] Assignee: Eastman Kodak Company, Rochester, N.Y.

[22] Filed: July 22, 1974

[21] Appl. No.: 490,430

[52] U.S. Cl............... 260/22 D; 156/332; 161/214; 260/22 CB; 260/23 P; 260/33.6 R; 428/458; 428/481
[51] Int. Cl.$^2$...................... C08G 63/48; C09J 3/02
[58] Field of Search ............ 260/22 D; 117/122 PA; 156/332; 161/214; 428/458, 481

[56] References Cited
UNITED STATES PATENTS

| 3,383,343 | 5/1968 | Mohajer et al. ............... 260/22 D |
| 3,390,108 | 6/1968 | Keck et al. ........................ 260/7.5 |
| 3,642,679 | 2/1972 | Young ......................... 117/122 PA |
| 3,644,267 | 2/1972 | Jackson et al. ................ 260/33.6 R |
| 3,657,389 | 4/1972 | Caldwell et al. ................... 260/873 |
| 3,743,616 | 7/1973 | Kest ................................ 260/27 BB |
| 3,770,677 | 11/1973 | Mestetsky ..................... 117/122 PA |
| 3,795,644 | 3/1974 | Jackson et al. ................... 260/22 D |
| 3,827,999 | 8/1974 | Crossland ................... 260/33.6 AQ |
| R27,279 | 1/1972 | Layman ............................ 260/22 D |

*Primary Examiner*—Ronald W. Griffin
*Attorney, Agent, or Firm*—J. Frederick Thomsen; Daniel B. Reece, III

[57] ABSTRACT

Hot melt compositions having very low melt viscosity and high adhesive strength, especially to metals, are disclosed. The compositions include a copolyester derived from a glycol having from 2 to 10 carbon atoms, terephthalic acid and dimer acid, blended with an aliphatic hydrocarbon having a molecular weight of from about 250 to about 1200. The composition may be modified if desired by adding a small amount of a vinyl aromatic polymer.

16 Claims, No Drawings

HOT MELT COMPOSITIONS

This invention relates generally to hot melt compositions, and more specifically, this invention relates to hot melt adhesive compositions having a relatively low melt viscosity and improved adhesion to metals comprising a blend of a polyester and an aliphatic hydrocarbon having a molecular weight of from about 250 to about 1200.

Hot melt adhesive compositions are of importance because of their speed of application compared with other types of adhesives. Also, there are no solvents to evaporate, no curing takes place, and strong adhesive bonds are obtained as soon as the adhesive cools. Polyesters have been found useful in hot melt adhesives. Many polyesters, however, have low adhesive strength, particularly peel strength, on various uncoated substrates such as aluminum, copper, steel, glass, etc., and on substrates coated with various materials, such as polyepoxide resins, vinyls, phenolics, alkyds, acrylics, etc. Moreover, many hot melt adhesives, particularly crystalline high melting polyesters, have high melt viscosities, resulting in inferior flow and wetting properties and, therefore, must be applied at relatively high temperatures when used as hot melt adhesives. It is desirable that these hot melt adhesives have a relatively low melt viscosity for ease of application. The hot melt adhesives according to this invention are useful in such applications as seam adhesives for metal cans.

In U.S. Pat. No. 3,657,389, hot melt adhesive blends of poly(tetramethylene terephthalate) and polystyrene are disclosed. The adhesion to certain metals of the polyester of particular inherent viscosity (I.V.) is increased by the addition of polystyrene. A similar I.V. poly(tetramethylene terephthalate) modified with 15–20 mole percent dimer acid and blended with polystyrene has now been found to provide a dramatic increase in adhesion, especially to uncoated steel. In our U.S. application Ser. No. 280,930 filed Aug. 14, 1972, now U.S. Pat. No. 3,795,644, hot melt adhesive compositions comprising a polyester derived mainly from 1,4-butanediol, terephthalic acid and dimer acid, blended with a vinyl aromatic polymer are disclosed.

In our pending application Ser. No. 425,046 filed Dec. 14, 1973, it is disclosed that similar compositions in which the polyester is derived from different glycols are also useful.

Modification of terephthalate polyesters in the adhesive blends with dimer acid decreases the melt viscosity of the blend at any given I.V. and the decrease in melt viscosity increases with increasing dimer acid modification. In many instances a melt viscosity of less than about 1000 poise is desirable. A relatively low melt viscosity can be obtained by 20 mole percent dimer acid modification of poly(tetramethylene) terephthalate blended with 15 weight percent polystyrene. At dimer acid contents greater than about 40 mole percent, the blend of copolyester and vinyl aromatic polymer has decreased heat resistance, whereas in the range of about 5–20%, the adhesively bonded substrates may be used at temperatures up to about 100°C. This blend, having an I.V. of 0.60, has good adhesion on metals compared to the blend without dimer acid. Polystyrene alone has very poor adhesive properties and dimer acid-modified terephthalate polyesters also have poor adhesive properties, but blends of these two polymers exhibit a remarkable improvement in adhesive properties.

It has now been found that hot melt adhesives having very low viscosity and improved adhesion to metals may be provided by preparing a composition which includes a copolyester derived from a glycol having from 2 to 10 carbon atoms, terephthalic acid and dimer acid, blended with an aliphatic hydrocarbon having a molecular weight of from about 250 to about 1200. The composition may be modified if desired by adding a small amount of a polymeric material comprising a vinyl aromatic polymer derived from a monomer of the formula

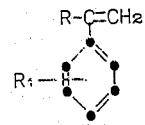

wherein R is hydrogen or an alkyl group containing 1 to 4 carbon atoms and $R_1$ is hydrogen, chlorine, alkyl from 1 to 4 carbon atoms or phenyl.

It may be expected that the blend containing the aliphatic hydrocarbon would have a lower melt viscosity, but it was indeed surprising to find that this composition had greater adhesive ability. Addition of the vinyl aromatic polymer to the blend results in improved ability of the blend to be extruded.

It is, therefore, an object of this invention to provide hot melt adhesive compositions with improved adhesion to various types of substrates, especially metals.

Another object is to provide a hot melt adhesive composition having a relatively low melt viscosity.

A still further object is to provide laminated articles consisting of various substrates bonded with these compositions.

Other objects are apparent elsewhere in this specification.

These objects have been obtained in accordance with the present invention through the discovery that terephthalate polyesters modified with dimer acid and blended with aliphatic hydrocarbons having a molecular weight of from about 250 to about 1200, and optionally, a vinyl aromatic polymer unexpectedly gives greatly improved adhesion on substrates such as metal and low melt viscosity. The polyester is blended with from about 5 to about 50% by weight of the aliphatic hydrocarbon, and preferably from about 20 to about 35% aliphatic hydrocarbon, the weight percent of the aliphatic hydrocarbon being based on the total weight of the blend. It may also be desirable that the blend of the polyester and aliphatic hydrocarbon contain from about 5 to about 15%, based on the total weight of the blend, of a vinyl aromatic monomer and that the total weight of the vinyl aromatic polymer and aliphatic hydrocarbon does not exceed 30 weight percent, based on the total blend weight.

The polyester portion of the blend preferably has an I.V. of at least about 0.5 (most desirably from 0.6 to 0.8) and is derived from A. A glycol component, at least about 80 mole percent of which is an aliphatic or cycloaliphatic glycol containing from 2 to 10 carbon atoms. Other glycols, aliphatic or alicyclic, straight or branched chain, containing 11 to 40 carbon atoms may also be included in the glycol component in amounts not exceeding about 20 mole percent, and B. an acid component of
 1. dicarboxylic acid containing from 2 to 20 carbon atoms, at least about 80 mole percent of which is an aromatic dicarboxylic acid containing 8 to 20 carbon atoms, preferably terephthalic acid. Other dicarboxylic acids, aliphatic, or alicyclic, containing from 2 to 20 carbon atoms may also be included in this component in amounts not exceeding about 20 mole percent, and
 2. a dimer acid component, as defined herein.

The acid component contains from about 60 to about 95 (preferably about 75 to about 90) mole percent of dicarboxylic acid (1) and from about 30 to about 5 (preferably about 25 to about 15) mole percent dimer acid (2). Where the major glycol component is 1,4-butanediol, however, the acid component may contain as much as 40 mole percent dimer acid. Since the dicarboxylic acid of 2–20 carbon atoms must be at least about 80 mole percent aromatic, the minimum amount of aromatic acid, based on the total acid content, is 48 mole percent. The blend may include a vinyl aromatic polymer, preferably polystyrene.

The term "dimer acid" as used herein refers to a 36 carbon atom, long chain, aliphatic dicarboxylic acid. The preparation and structure of the dimer acids are described in *Journal of American Oil Chemists Society*, 39, 534–545 (1962). It is generally prepared by dimerizing an unsaturated fatty acid containing 18 carbon atoms such as linoleic or linolenic acid or a monohydric alcohol ester thereof. It is recognized in the art that dimer acids are chemicals of unique properties. Several different grades of dimer acids are available commercially which vary in monomer and trimer content and iodine value. For example, dimer acid is available from Emery Industries, Inc. Preferably, the dimer acid used in this invention is substantially free of monomer and trimer fractions, which can be accomplished by distillation. Preferably, the dimer acid content is at least 95%. The dimer acid may be used in its hydrogenated or unhydrogenated form.

Although up to about 20 mole percent of the glycols and dicarboxylic acids, other than 2–10 carbon aliphatic or alicyclic glycols and aromatic acid may be used in the copolyester component of this invention if desired, it is preferred that the glycol and dicarboxylic acid portion be essentially 2–10 carbon atom glycols, and terephthalic acid. Glycols containing from 2 to 6 carbon atoms are preferred because of the higher melting points of their polyesters. Other suitable glycols are alicyclic and aliphatic glycols containing from 11 to 40 carbon atoms. The carbon chain may be straight or branched. Examples of suitable glycols include ethylene glycol; 1,4-butanediol; 1,6-hexanediol; 1,10-decanediol; 2,2-dimethyl-1,3-propanediol; 1,4-cyclohexanedimethanol; 1,4-cyclohexanediol; diethylene glycol; triethylene glycol and dimer glycol. Other suitable dicarboxylic acids are straight and branched chain aliphatic, alicyclic and aromatic acids containing from 2 to 20 carbon atoms including maleic, dimethylmalonic, adipic, 2-methyladipic, azelaic, sebacic, isophthalic, hexahydroterephthalic, hexahydroisophthalic, trans-1,4-cyclohexanedicarboxylic, 2,5-norbornanedicarboxylic and oxydipropionic acid.

The aliphatic hydrocarbon portion of the blend according to this invention may be straight chained or branched, may contain appreciable cycloaliphatic carbon, may be mixtures of these structures, and may contain up to about 20% aromatic carbon atoms based on the total number of carbon atoms present therein. The molecular weight range is from about 250 to about 1200. Lower molecular weights may be lost by volatilization during blend preparation or application of the adhesive blend. Higher molecular weights are often less compatible with the polyester and result in higher melt viscosity of the adhesive blends. The preferred molecular weight range is from about 400 to about 800.

Among the preferred aliphatic hydrocarbons are mineral oils, eicosane, hexacosane, triacontane, pentatriacontane, waxes such as paraffin wax, and petrolatum. The preferred aliphatic hydrocarbon is mineral oil having a molecular weight of about 450.

The vinyl aromatic polymers which may be used if desired in the adhesive blends of the invention are prepared by conventional procedures from the corresponding monomers and contain at least 50 weight percent of polymer units derived from at least one monomer having the formula:

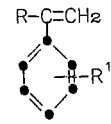

wherein R is hydrogen or an alkyl group containing 1 to 4 carbon atoms and $R^1$ is hydrogen or at least one member selected from the group consisting of chlorine, alkyl groups containing 1 to 4 carbon atoms, and phenyl.

The vinyl aromatic polymer may be a copolymer, block copolymer, graft polymer, or blend containing up to 50 weight percent of polymer units derived from one or more of the following: olefins containing up to 12 carbon atoms (e.g., ethylene, propylene, butene, 4-methylpentene), butadiene, vinylnaphthalene, divinylbenzene, alkyl esters of acrylic and methacrylic acids wherein the alkyl groups contain from 1 to 4 carbons, acrylonitrile, methacrylonitrile, maleic anhydride, vinyl acetate, and other polymerizable compounds containing a —CH=C< group and which give copolymers which are stable under the extrusion and bonding conditions. Polystyrene is the preferred vinyl aromatic polymer. The inherent viscosity of the vinyl aromatic polymers, if used in the blends of the invention, may vary from about 0.1 to 0.8 or more, but the preferred inherent viscosity is about 0.4 to about 0.6.

The copolyesters of this invention are prepared by conventional techniques, for example, by ester interchange of the glycol or glycols with the dimethyl ester of terephthalic acid and simultaneous direct esterification of the dimer acid in the presence of a titanium alkoxide catalyst. Copolyesters of the aliphatic or alicyclic glycols with terephthalic acid containing up to 50 mole percent or more of dimer acid having inherent viscosities of up to 1.5 can be prepared by this procedure. The preferred dimer acid content is 15–25 mole percent and the preferred inherent viscosity is 0.6–0.7 to obtain the desired low melt viscosity adhesive blends.

Blending of the polyester and hydrocarbon compositions with vinyl polymers and other additives, if used, may be carried out by various common procedures, including mechanical mixing of the particles, blending on hot rolls, mixing in the melt, or mixing in solution and then removing the solvent. A satisfactory procedure is to stir the two polymers together under an inert atmosphere in a flask immersed in a metal bath.

Substances which may be laminated by the adhesives of this invention include metals (such as steel, iron, aluminum, chromium, copper, brass, bronze, nickel, zinc, titanium, and tin), wood, glass, paper, cardboard, and fabrics. The same or different materials may be laminated in one structure. It is generally advisable to clean the surfaces of the components to be laminated just prior to formation of the melt adhesive bonds to remove foreign matter, grease, oxide coatings, etc., which might interfere with the formation of strong bonds.

The polyester adhesive may be applied in molten form with a spatula or conventional extrusion equipment to the surfaces of the components to be laminated. Alternatively, a film of the polyester (2 to 6 mils in thickness) may be placed between the surfaces. After application of the polyester, the surfaces are clamped together with a pressure of several pounds per square inch and heat is applied by placing the clamped structure in a forced-air oven about 20° to 50°C. above the softening range of the polyester. A convenient way of bonding metal test strips for peel tests is to heat them together on a hot plate while rubbing back and forth with a wooden spatula. No additional pressure is necessary. A glue line (adhesive thickness) of 3 to 5 mils is satisfactory.

Fillers, pigments, processing aids, metal powders and glass cloth may be incorporated in the adhesive layer to increase the bonding strength and temperature resistance. Fillers and pigments, such as very finely divided silica, iron powder, alumina, talc or calcium carbonate, also affect the degree of crystallinity and the size of the spherulites. From 1 to 20% by weight may be added. Additives or processing aids may be used to further decrease the melt viscosity of the blends for more ease of application. Antioxidants and stabilizers also may be incorporated in the polymers to improve the thermal and oxidative stability at elevated temperatures.

In the examples which follow, all copolyesters are prepared by conventional condensation polymerization procedures from the respective glycol, the dimethyl ester(s) of the respective dicarboxylic acid(s), and dimer acid in the presence of titanium tetraisopropoxide catalyst (150 ppm. Ti, based on the weight of copolyester). Inherent viscosities (I.V.) are determined at a concentration of 0.50 g./100 ml. in 60/40 phenol/tetrachloroethane at 25°C. Corrections are made for the hydrocarbon additives in the blends.

The compatibility limit of a hydrocarbon component with a particular copolyester is determined by heating 4.0 g. of the copolyester in a tared test tube containing a glass stirring rod under nitrogen at 250°C. while stirring and slowly adding the hydrocarbon component until the mixture becomes detectably hazy. By reweighing the tube, the total blend weight, weight of hydrocarbon component, and weight percent of hydrocarbon component can be calculated. An exception is the dimer acid-modified polyterephthalate of 1,4-cyclohexanedimethanol (Example 41 in Table 1) which is heated at 260°C. instead of 250°C. because of its relatively high melting point and melt viscosity. The compatibility limit for a hydrocarbon component is defined as the weight percent of this component based on total blend weight which produces a slight haze in the melt when blended with a particular copolyester at 250°C., with the above exception.

The molecular weights of the hydrocarbon components described in the examples are determined ebulliometrically in toluene according to the method published in Analytical Chemistry, Vol. 33, p. 447, March, 1961, a conventional test.

All copolyester/hydrocarbon component blends are prepared by placing the copolyester and component in a flask equipped with stirrer and provision for evacuation and a nitrogen atmosphere. After being evacuated and bled to nitrogen three times, the flask is heated at 250°C. with rapid-stirring for 30–40 minutes until a uniform blend (which may be transparent to opaque, depending upon the copolyester and concentration of hydrocarbon component) is obtained. An exception is the blend which contains the dimer acid-modified polyterephthalate of 1,4-cyclohexanedimethanol. The blend is prepared at 265°C. because of its relatively high melting point and melt viscosity (Example 41 in Table 1). The blends are then cooled under nitrogen, removed from the flask, and used to prepare adhesive bonds for testing. The melt viscosity of the copolyester/hydrocarbon additive blends is determined with a Brookfield viscometer, Model LVT, and a Brookfield Thermosel Viscosity System according to ASTM 2556-66T at 240°C. and at shear rates $\leq 3.36$ sec.$^{-1}$, except 10.0 g. instead of 10 cc. of blend is used and the sample is vacuum dried at 90°–95°C. before testing. The melt viscosity is measured after the sample is stirred in the viscometer for 20 minutes at 240°C., and a sample of the material is then immediately removed from the unit for inherent viscosity determination (as earlier described). Exceptions are samples containing the dimer acid-modified polyterephthalate of 1,4-cyclohexanedimethanol (Examples 40 and 41, Table 1), which are measured at 260°C., and samples containing poly(hexamethylene terephthalate) modified with 30 mole percent of dimer acid (Examples 37, 38, and 39 in Table 1), which are measured at 175°C. after 30 minutes heating.

The T-peel strengths are determined on 12-mil aluminum (Type 1145) in accordance with ASTM D1876, but using precut (1-in. wide) specimens. The metal specimens are first degreased by washing three times in a detergent solution of Alconox (Alconox, Inc.) and rinsing in water each time. The metal specimens are then rinsed in acetone and allowed to air dry. These air-dried specimens are used to determine T-peel strength.

To prepare an adhesive bond, a specimen is heated sufficiently on a hot plate for the copolyester/hydrocarbon component blend to melt (applied as 20-mesh to 1/8-inch particles or by rubbing a large piece back and forth). A hot plate temperature of 220°–280°C. is used. After the molten polymer is evenly spread on the specimen over a 2-inch length with a wooden spatula, the top piece of metal is pressed against the sample. The sample is then turned over on the hot plate with the second metal strip against the hot plate surface. Heating is continued while the wooden spatula is rubbed back and forth over the adhesive area until a smooth, even glue line is obtained (about 20 seconds). Then the specimen is placed on the laboratory bench and rubbing continued for about 10 seconds longer while the adhesive cools. This method of forming the adhesive bonds gives reproducible results similar to those obtained by clamping the specimens together and heating in a forced-air oven 20°–50°C. above the polymer melting point. Glue lines are about 2 to 4 mils in thickness.

Table 1

Properties of Dimer Acid-Modified Polyterephthalates Blended With Hydrocarbon Components

| | Polyterephthalate | | | Hydrocarbon Component Data | | | Blend Data | | | Adhesive Data | |
|---|---|---|---|---|---|---|---|---|---|---|---|
| Ex. | Glycol Intermediate | Dimer Acid, Mole % | I.V. | Component | Mol. Wt. | Compatibility Limit at 250°C., Wt.% | Hydrocarbon Component Content, Wt.% | Blend I.V. | Melt Viscosity I.V. Poise | | T-Peel, Lb./In. Width −40°C. | 23°C. |
| 1* | Ethylene glycol | 20 | 0.63 | None | — | — | 0 | 0.63 | 0.51 | 484 | 4 | 19 |
| 2 | Ethylene glycol | 20 | 0.78 | Mineral Oil | 440 | 18 | 18 | 0.62 | 0.54 | 196 | 44 | 21 |
| 3 | Ethylene glycol | 20 | 0.78 | Mineral Oil | 440 | 18 | 23 | 0.62 | 0.54 | 218 | 46 | 23 |
| 4 | Ethylene glycol | 20 | 0.78 | Mineral Oil | 440 | 18 | 30 | 0.59 | 0.53 | 220 | 44 | 21 |
| 5* | Ethylene glycol | 30 | 0.72 | None | — | — | 0 | 0.72 | 0.65 | 1820 | 3 | 22 |
| 6 | Ethylene glycol | 30 | 0.72 | Mineral Oil | 440 | 38 | 43 | 0.67 | 0.59 | 37 | 20 | 13 |
| 7* | 1,4-Butanediol | 5 | 1.09 | None | — | — | 0 | 1.09 | 1.05 | >2000 | 6 | 6 |
| 8 | 1,4-Butanediol | 5 | 1.09 | Mineral Oil | 440 | 5 | 10 | 0.91 | 0.82 | >2000 | 33 | 31 |
| 9* | 1,4-Butanediol | 10 | 0.83 | None | — | — | 0 | 0.83 | 0.71 | 1580 | 3 | 3 |
| 10 | 1,4-Butanediol | 10 | 0.83 | Mineral Oil | 440 | 10 | 10 | 0.79 | 0.75 | 870 | 12 | 6 |
| 11 | 1,4-Butanediol | 10 | 0.83 | Mineral Oil | 440 | 10 | 15 | 0.80 | 0.77 | 970 | 16 | 22 |
| 12 | 1,4-Butanediol | 10 | 0.83 | Mineral Oil | 440 | 10 | 20 | 0.79 | 0.72 | 930 | 18 | 22 |
| 13 | 1,4-Butanediol | 10 | 0.83 | Paraffin wax | 500 | 5 | 5 | 0.81 | 0.76 | 1200 | 3 | 3 |
| 14 | 1,4-Butanediol | 10 | 0.83 | Paraffin wax | 500 | 5 | 10 | 0.80 | 0.75 | 1120 | 12 | 10 |
| 15* | 1,4-Butanediol | 20 | 0.67 | None | — | — | 0 | 0.67 | 0.66 | 580 | 3 | 7 |
| 16 | 1,4-Butanediol | 20 | 0.67 | Eicosane | 282 | 25 | 30 | 0.67 | 0.62 | 44 | 10 | 5 |
| 17 | 1,4-Butanediol | 20 | 0.78 | Mineral Oil | 440 | 25 | 10 | 0.72 | 0.68 | 390 | 3 | 3 |
| 18 | 1,4-Butanediol | 20 | 0.78 | Mineral Oil | 440 | 25 | 21 | 0.68 | 0.62 | 112 | 20 | 13 |
| 19 | 1,4-Butanediol | 20 | 0.78 | Mineral Oil | 440 | 25 | 25 | 0.71 | 0.65 | 112 | 26 | 21 |
| 20 | 1,4-Butanediol | 20 | 0.78 | Mineral Oil | 440 | 25 | 30 | 0.68 | 0.65 | 106 | 27 | 30 |
| 21 | 1,4-Butanediol | 20 | 0.78 | Mineral Oil | 440 | 25 | 35 | 0.68 | 0.65 | 98 | 19 | 27 |
| 22 | 1,4-Butanediol | 20 | 0.78 | Mineral Oil | 440 | 25 | 40 | 0.67 | 0.63 | 86 | 14 | 27 |
| 23 | 1,4-Butanediol | 20 | 0.78 | Paraffin wax | 500 | 17 | 17 | 0.71 | 0.67 | 186 | 15 | 3 |
| 24 | 1,4-Butanediol | 20 | 0.78 | Paraffin wax | 500 | 17 | 23 | 0.71 | 0.69 | 239 | 12 | 9 |
| 25 | 1,4-Butanediol | 20 | 0.78 | Paraffin wax | 500 | 17 | 30 | 0.70 | 0.69 | 304 | 16 | 25 |
| 26 | 1,4-Butanediol | 20 | 0.78 | Paraffin wax | 500 | 17 | 35 | 0.66 | 0.62 | 138 | 13 | 23 |
| 27 | 1,4-Butanediol | 20 | 0.78 | Petrolatum | 730 | 10 | 10 | 0.66 | 0.63 | 246 | 9 | 10 |
| 28 | 1,4-Butanediol | 20 | 0.78 | Petrolatum | 730 | 10 | 20 | 0.72 | 0.69 | 406 | 7 | 27 |
| 29 | 1,4-Butanediol | 20 | 0.78 | Petrolatum | 730 | 10 | 30 | 0.73 | 0.68 | 410 | 6 | 19 |
| 30* | 1,4-Butanediol | 25 | 0.96 | None | — | — | 0 | 0.96 | 0.95 | 2000 | 4 | 17 |

Table 1-continued

Properties of Dimer Acid-Modified Polyterephthalates Blended With Hydrocarbon Components

| | Polyterephthalate | | | Hydrocarbon Component Data | | | Blend Data | | Melt Viscosity | | Adhesive Data T-Peel, Lb./In. Width | |
|---|---|---|---|---|---|---|---|---|---|---|---|---|
| Ex. | Glycol Intermediate | Dimer Acid, Mole % | I.V. | Component | Mol. Wt. | Compatibility Limit at 250°C., Wt.% | Hydrocarbon Component Content, Wt.% | Blend I.V. | I.V. | Poise | −40°C. | 23°C. |
| 31 | 1,4-Butanediol | 25 | 0.96 | Mineral Oil | 440 | 34 | 39 | 0.87 | 0.78 | 196 | 15 | 21 |
| 32* | 1,4-Butanediol | 30 | 0.85 | None | — | — | 0 | 0.85 | 0.82 | 2000 | 5 | 16 |
| 33 | 1,4-Butanediol | 30 | 0.85 | Mineral Oil | 440 | 45 | 45 | 0.76 | 0.72 | 39 | 12 | 12 |
| 34 | 1,4-Butanediol | 30 | 0.85 | Mineral Oil | 440 | 45 | 50 | 0.78 | 0.73 | 47 | 11 | 9 |
| 35* | 1,6-Hexanediol | 20 | 0.75 | None | — | — | 0 | 0.75 | 0.71 | 770 | 2 | 14 |
| 36 | 1,6-Hexanediol | 20 | 0.75 | Mineral Oil | 440 | 38 | 43 | 0.72 | 0.68 | 37 | 20 | 15 |
| 37* | 1,6-Hexanediol | 30 | 0.70 | None | — | — | 0 | 0.70 | 0.68 | 1210 | 18 | 16 |
| 38 | 1,6-Hexanediol | 30 | 0.70 | Petrolatum | 730 | 27 | 27 | 0.61 | 0.58 | 31 | 23 | 5 |
| 39 | 1,6-Hexanediol | 30 | 0.70 | Petrolatum | 730 | 27 | 32 | 0.62 | 0.57 | 26 | 23 | 4 |
| 40* | 70/30 trans/cis-1,4-cyclohexane-dimethanol | 20 | 0.96 | None | — | — | 0 | 0.96 | 0.85 | 2000 | 9 | 22 |
| 41 | 70/30 trans/cis-1,4-cyclohexane-dimethanol | 20 | 096 | Mineral | 440 | 32 | 35 | 0.79 | 0.69 | 178 | 19 | 9 |

*Control

The examples in Table 1 illustrate the improved T-peel strengths on aluminum substrates at −40°C. and/or 23°C. and the substantial reduction in melt viscosity obtained when a number of aliphatic hydrocarbon components are blended with several polyterephthalates modified with 5–30 mole percent dimer acid. Similarly improved T-peel strengths are obtained on tin-free steel substrates. The examples in Table 1 also illustrate the unanticipated sudden rise in T-peel strength obtained with the copolyester/hydrocarbon component blends as the hydrocarbon component concentration in the blend approaches and exceeds its compatibility limit by as much as 18 weight percent units (Examples 17–26 and others in Table 1). The sudden rise in T-peel strength obtained is unobvious, since it would be expected that the addition of enough hydrocarbon component to give an incompatible blend would give poorer adhesion. This phenomenon is very well illustrated by Examples 15 (control) and 17–20 in Table 1. In these examples of blends with similar I.V.'s, the T-peel strength at −40°C. and 23° C. is increased from 4 to 9 times the T-peel strength of the copolyester containing no hydrocarbon component. At the same time, the Brookfield melt viscosity at 240°C. (which is determined at <1 sec.$^{-1}$) is decreased to a value which is only about 18% of that of the control (Examples 15 and 20 in Table 1). At a higher shear rate (1000 sec.$^{-1}$) at 240°C., the decrease in melt viscosity imparted by the addition of sufficient mineral oil to be incompatible is much more pronounced. The melt viscosity, in this case, is reduced from about 500 poise for the copolyester alone to about 12 poise for the copolyester blended with 30 weight percent mineral oil. These values represent more than a 97% decrease in melt viscosity at these conditions by the addition of 30 weight percent mineral oil.

Examples 42–48 in Table 2 illustrate the utility of (1) hydrocarbon components which contain a substantial percentage of cycloaliphatic carbon atoms and (2) hydrocarbon components which contain an appreciable percentage of aromatic carbon atoms, and (3) such hydrocarbon components having molecular weights of greater than 900. These components are called "naphthenic oils" and are sold commercially by the Exxon Table 2

Properties of Poly(tetramethylene terephthalate) Modified With 20 Mole Percent Dimer Acid/Naphthenic Oil Blends

| | Naphthenic Oil$^a$ | | | Blend Data | | Melt Viscosity | | Adhesive Data T-Peel on 12-Mil Aluminum, Lb./In. Width | |
|---|---|---|---|---|---|---|---|---|---|
| Example | Component | Molecular Weight | Compatibility Limit, Wt. % | Naphthenic Oil Content of Blend, Wt. % | Blend I.V. | I.V. | Poise | −40°C. | 23°C. |
| 42 (Control) | None | — | — | None | 0.67 | 0.66 | 580 | 3 | 7 |
| 43 | Flexon 875 | 580 | 19 | 20 | 0.67 | 0.63 | 123 | — | 14 |
| 44 | Flexon 875 | 580 | 19 | 25 | 0.65 | 0.63 | 96 | — | 30 |
| 45 | Flexon 875 | 580 | 19 | 30 | 0.68 | 0.65 | 116 | — | 28 |
| 46 | Flexon 790 | 710 | 20 | 30 | 0.63 | 0.59 | 116 | 17 | 20 |
| 47 | Flexon 791 | 760 | 16 | 26 | 0.63 | 0.61 | 136 | 16 | 27 |
| 48 | Flexon 895 | 915 | 10 | 20 | 0.63 | 0.61 | 191 | 13 | 19 |

$^a$See Table 3 for composition of oil.

Chemical Co. under the tradename "Flexon". Table 3 gives data on these hydrocarbon components. The term "naphthenic carbon atoms" means that the carbon atoms are a part of a cycloaliphatic structure, usually cyclopentane and cyclohexane rings.

Table 3

| Naphthenic Oil | Carbon Type Analysis, % | | |
|---|---|---|---|
| | Aromatic | Aliphatic | Naphthenic |
| Flexon 790 | 9 | 59 | 32 |
| Flexon 791 | 11 | 61 | 28 |
| Flexon 875 | 4 | 68 | 28 |
| Flexon 895 | 5 | 68 | 27 |

The copolyester used to prepare the blends described in Examples 43–48 is poly(tetramethylene terephthalate) modified with 20 mole percent dimer acid, I.V. 0.78.

The T-peel strengths at −40° and/or 23°C. on aluminum substrates of the blends of Examples 43–48 in Table 2 are substantially improved, while the melt viscosity is substantially decreased, when compared to those of the copolyester control (Example 42 in Table 2). Similarly improved T-peel strengths are also obtained on tin-free steel substrates.

Examples 49 and 50 illustrate the utility of a dimer acid-modified copolyester containing 20 mole percent isophthalate modification in the present invention.

A copolyester of 1,4-butanediol with 70/20/10 molar ratios of terephthalic/isophthalic/dimer acids is prepared by standard procedures to I.V. 0.74. The compatibility limit of this copolyester with mineral oil (mol. wt. 440) at 250°C. is 12 weight percent, and the Brookfield melt viscosity of the copolyester at 240°C. is 1200 poise at 0.42 sec.$^{-1}$ and 0.68 I.V. A blend of this copolyester with 20 weight percent mineral oil is prepared and its I.V. and melt viscosity (at 240°C.) are, respectively, 0.67 and 740 poise at 0.84 sec.$^{-1}$ (I.V. of melt viscosity sample: 0.63). The T-peel strengths of the copolyester and the copolyester/20% mineral oil blend are given in Examples 49 and 50 in Table 4.

Table 4

| Example | Mineral Oil Content, % | T-Peel on 12-Mil Aluminum, Lb./In. Width | |
|---|---|---|---|
| | | −°C. | 23°C. |
| 49 | 0 | 7 | 5 |
| 50 | 20 | 17 | 23 |

Similarly improved T-peel strengths are obtained on tin-free steel substrates.

Examples 51–54 in Table 5 illustrate the improved extrudability and good adhesive strength obtained when a vinyl aromatic polymer, polystyrene, is coblended with mineral oil in poly(tetramethylene terephthalate) modified with 20 mole percent dimer acid. These blends are prepared by "preblending" at 250°C. the appropriate amount of mineral oil with the copolyester (I.V. 0.78) as earlier described, cooling to 23°C., and grinding to pass a 3-mm. screen. This granular product is then physically mixed with granulated polystyrene and melt extruded in a ¾-in. extruder at ~200°C. Extrudability is rated as poor (will not extrude), fair (extrudes slowly only when manually fed), and good (extrudes at normal rate without manual aid). T-peel strengths are determined at 23°C.

Table 5

| Example No. | Components | | Blend I.V. | Extrudability | T-Peel Strength, Lb./In. Width | |
|---|---|---|---|---|---|---|
| | Polystyrene Content, % | Mineral Oil Content, % | | | Tin-Free Steel (6-mil) | Aluminum (12-mil) |
| 51 | 0 | 30 | 0.68 | poor | 27 | 30 |
| 52 | 5 | 25 | 0.72 | fair | 26 | 29 |
| 53 | 10 | 20 | 0.69 | good | 27 | 29 |
| 54 | 15 | 15 | 0.69 | good | 29 | 30 |

All of the blends in Table 5 contain a total of 30 weight percent total component(s). Substantially poorer T-peel strength is obtained if this total is decreased to 25% or increased to 35%.

EXAMPLE 55

This example illustrates the excellent adhesive strength and very low melt viscosity of poly(ethylene terephthalate) modified with 20 mole percent dimer acid blended with a vinyl aromatic polymer (polystyrene) and mineral oil.

The adhesive blend is prepared by melt blending in a flask at 250°C. under nitrogen: (1) 80.0 g. poly(ethylene terephthalate) modified with 20 mole percent dimer acid, I.V. 0.51, (2) 10 g. (10 weight percent) polystyrene, I.V. 0.60, and (3) 10.0 g. (10 weight percent) mineral oil (m.w. 440). The blend I.V. (corrected for mineral oil content) is 0.49, and its Brookfield viscosity at 240°C. is 102 poise at an I.V. of 0.45. The T-peel strength of 23°C. of this blend on 12-mil aluminum is 38 lb./in. width. Example 1 (control) in Table 1 illustrates the substantially lower T-peel strength obtained when no hydrocarbon and polystyrene components are present.

Unless otherwise specified, all parts, percentages, ratios, etc., are by weight.

Although the invention has been described in considerable detail with particular reference to certain preferred embodiments thereof, variations and modifications can be effected within the spirit and scope of the invention.

We claim:
1. An adhesive composition comprising
   A. from about 50 to about 95 weight percent of a copolyester of
      1. a glycol component containing at least about 80 mole percent of a glycol having from 2 to 10 carbon atoms, and
      2. an acid component which is at least about 48 mole percent of an aromatic dicarboxylic acid having from 8 to 20 carbon atoms or an ester forming derivative thereof, and from about 5 to about 40 mole percent dimer acid, and

B. from about 50 to about 5 weight percent of an aliphatic hydrocarbon having a molecular weight of from about 250 to about 1200.

2. An adhesive composition according to claim 1 wherein said polyester is present in an amount of from about 65 to about 80 percent by weight and said aliphatic hydrocarbon is present in an amount of from about 35 to about 20 percent by weight.

3. An adhesive composition according to claim 1 wherein said aromatic dicarboxylic acid is terephthalic acid.

4. An adhesive composition according to claim 1 wherein the I.V. is at least 0.5.

5. An adhesive composition according to claim 1 wherein the dimer acid content of said polyester is from about 15 to about 30 mole percent.

6. An adhesive composition according to claim 1 wherein the dimer acid content of said polyester is from about 15 to about 25 mole percent.

7. An adhesive composition according to claim 1 wherein said glycol is 1,4-butanediol or ethylene glycol.

8. An adhesive composition according to claim 1 wherein said aliphatic hydrocarbon has a molecular weight of from about 400 to about 800.

9. An adhesive composition according to claim 1 wherein said aliphatic hydrocarbon is mineral oil.

10. An adhesive composition according to claim 1 having from about 5 to about 15 percent, based on the total weight of the blend, of a vinyl aromatic hydrocarbon.

11. An adhesive composition according to claim 10 wherein said vinyl aromatic hydrocarbon is polystyrene.

12. An adhesive composition comprising
   A. a copolyester of
      1. a glycol component containing at least about 80 mole percent of a glycol having from 2 to 10 carbon atoms, and
      2. an acid component which is at least about 48 mole percent terephthalic acid or an ester forming derivative thereof, and from about 15 to about 25 mole percent dimer acid,
   B. from about 35 to about 20 weight percent of an aliphatic hydrocarbon having a molecular weight of from about 400 to about 800, and
   C. from about 5 to about 15%, based on the combined weight of (A) and (B) of polystyrene.

13. A substrate coated with an adhesive composition according to claim 1.

14. A substrate coated with the adhesive composition according to claim 12.

15. A pair of substrates bonded together with an adhesive composition according to claim 1.

16. A pair of substrates bonded together with an adhesive composition according to claim 12.

* * * * *